(12) United States Patent
Lo et al.

(10) Patent No.: US 8,443,390 B2
(45) Date of Patent: May 14, 2013

(54) ENHANCED METHOD AND APPARATUS FOR ENHANCING SUPPORT FOR SERVICE DELIVERY

(75) Inventors: Charles N. Lo, San Diego, CA (US); Donald W. Gillies, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 534 days.

(21) Appl. No.: 12/563,905

(22) Filed: Sep. 21, 2009

(65) Prior Publication Data

US 2010/0146553 A1 Jun. 10, 2010

Related U.S. Application Data

(60) Provisional application No. 61/120,358, filed on Dec. 5, 2008.

(51) Int. Cl.
*H04N 5/445* (2011.01)

(52) U.S. Cl.
USPC ............... 725/50; 725/32; 725/34; 725/37; 725/38; 725/40; 725/45; 725/46

(58) Field of Classification Search ............... 725/32–61
See application file for complete search history.

(56) References Cited

U.S. PATENT DOCUMENTS

| | | | |
|---|---|---|---|
| 6,088,722 A | 7/2000 | Herz et al. | |
| 6,757,691 B1 | 6/2004 | Welsh et al. | |
| 7,013,238 B1 | 3/2006 | Weare | |
| 7,136,945 B2 | 11/2006 | Gibbs et al. | |
| 7,209,900 B2 | 4/2007 | Hunter et al. | |
| 7,213,005 B2 | 5/2007 | Mourad et al. | |
| 7,277,870 B2 | 10/2007 | Mourad et al. | |
| 7,302,465 B2 | 11/2007 | Ayres et al. | |
| 7,370,016 B1 | 5/2008 | Hunter et al. | |
| 7,630,986 B1 | 12/2009 | Herz et al. | |

(Continued)

FOREIGN PATENT DOCUMENTS

JP 2001136453 A 5/2001
JP 2002351915 A 12/2002

(Continued)

OTHER PUBLICATIONS

OMA-RD-BCAST-V1_0-20070529-C, May 29, 2007, OMA, All Pages.*

(Continued)

*Primary Examiner* — Nicholas Corbo
(74) *Attorney, Agent, or Firm* — Fulbright & Jaworski L.L.P.

(57) ABSTRACT

A service distribution system supports creation of a personalized and virtual service broadcast that can be selectively clipped and cached based on content descriptors of popularity, freshness, etc. A method for selectively receiving broadcast of one or more content items associated with a service to provide a unicast or multicast user experience is described. The method may comprise: detecting a characteristic of a service, or detecting a characteristic of one or more content items, wherein the one or more content items are associated with the service, and wherein the characteristic is generated by a mobile operator and pertains to an objective measure of current user interest, selectively receiving by broadcast, to the mobile device, one or more content items associated with the service based on the characteristic, and storing the one or more content items associated with the service for access through a user interface of the mobile device.

44 Claims, 10 Drawing Sheets

U.S. PATENT DOCUMENTS

| | | |
|---|---|---|
| 7,706,740 B2 | 4/2010 | Collins et al. |
| 7,792,756 B2 | 9/2010 | Plastina et al. |
| 7,822,687 B2 | 10/2010 | Brillon et al. |
| 2002/0111912 A1 | 8/2002 | Hunter et al. |
| 2003/0028889 A1 | 2/2003 | McCoskey et al. |
| 2005/0262024 A1 | 11/2005 | Headings et al. |
| 2006/0015904 A1 | 1/2006 | Marcus |
| 2006/0161952 A1 | 7/2006 | Herz et al. |
| 2007/0111717 A1 | 5/2007 | Mueller et al. |
| 2007/0157264 A1* | 7/2007 | Garfinkle ................ 725/88 |
| 2007/0214030 A1 | 9/2007 | Shear et al. |
| 2007/0265979 A1 | 11/2007 | Hangartner |
| 2008/0034228 A1 | 2/2008 | Shear et al. |
| 2008/0148317 A1* | 6/2008 | Opaluch ................ 725/46 |
| 2008/0215557 A1 | 9/2008 | Ramer et al. |
| 2008/0270309 A1 | 10/2008 | Brotman et al. |
| 2009/0055376 A1 | 2/2009 | Slaney et al. |
| 2009/0083780 A1* | 3/2009 | Beyabani ................ 725/14 |
| 2009/0089294 A1 | 4/2009 | Davis et al. |
| 2009/0119710 A1 | 5/2009 | Lo et al. |
| 2010/0169910 A1 | 7/2010 | Collins et al. |

FOREIGN PATENT DOCUMENTS

| | | |
|---|---|---|
| JP | 2004535716 A | 11/2004 |
| JP | 2006324798 A | 11/2006 |
| KR | 100724645 B1 | 5/2007 |
| KR | 20070049042 A | 5/2007 |
| WO | WO2005107258 A1 | 11/2005 |

OTHER PUBLICATIONS archive.org, Aug. 6, 2007 (provided for proof of publication for item U).*

International Preliminary Report on Patentabitity, PCT/US2008/081939, international Preliminary Examining Authority, European Patent Office, Oct. 7, 2009.

International Search Report, PCT/US2008/081939, International Searching Authority, European Patent Office, Mar. 6, 2009.

Written Opinion, PCT/US2008/081939, International Searching Authority, European Patent Office, Mar. 6, 2009.

* cited by examiner

US 8,443,390 B2

ENHANCED METHOD AND APPARATUS FOR ENHANCING SUPPORT FOR SERVICE DELIVERY

CLAIM OF PRIORITY UNDER 35 U.S.C. §119

The present Application for Patent claims priority to Provisional Application No. 61/120,358 entitled "ENHANCED METHOD AND APPARATUS FOR ENHANCING SUPPORT FOR USER GENERATED CONTENT DELIVERY" filed Dec. 5, 2008, and assigned to the assignee hereof and hereby expressly incorporated by reference herein.

BACKGROUND

Second generation (2G) networks include Code Division Multiple Access (CDMA) and Global System for Mobile Communications (GSM) networks and provide a wireless connection for digital voice encoding. Third Generation (3G) mobile networks offer cellular data rates that approach a wired broadband connection. These 3G mobile networks are robust delivery mechanisms for a rich variety of services that are being offered around the world. From CDMA 2000-based networks to those based on WCDMA (Wide-band Code-Division Multiple Access), cellular users are able to access services and information that were once only available from a wired desktop computer. Using third generation technologies it is now possible to deliver applications and multimedia services, such as streaming video files and interactive television programming, to these mobile devices.

WCDMA is also referred to as Universal Mobile Telecommunications System (UMTS) and along with CDMA 2000 represent an evolution in terms of services and data speeds from today's 2G mobile networks. UMTS and CDMA 2000 third generation mobile technologies identified by the ITU (International Telecommunication Union) are expected to include capabilities and features such as: enhanced multimedia (voice, data, video, and remote control), usability on all popular modes (cellular telephone, e-mail, paging, fax, videoconferencing, and Web browsing), broad bandwidth and high speed (upwards of 2 Mbps) routing flexibility (repeater, satellite, LAN), operation at approximately 2 GHz frequencies, and roaming capability throughout Europe, Japan, and North America.

Today's mobile customers have already demonstrated a desire for "non-voice" and other new services. More than 24 billion text messages are sent every month, and now customers are choosing Multimedia Messaging Service (MMS), an evolution of text messaging that adds pictures and sound elements. CDMA 2000 and UMTS build on these first steps towards a mobile multimedia future, allowing operators to offer new services to consumers. The availability of these robust mobile networks and sophisticated handheld devices, coupled with increasing consumer demand for media content, has generated a need for improved methods of subscribing to multimedia programming and packaged content at a mobile device.

Limitations on Over-the-Air (OTA) resources and of available power and storage for mobile devices make unicast of content challenging for mobile devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with providing broadcast of a service comprising one or more content items associated with the service to a population of mobile devices that are selectively received and presented to mimic a unicast or multicast user experience. A mobile operator can characterize such a service to enable mobile devices to selectively receive and cache content items associated with a service of interest to a user. Thereby, a service that may not necessarily have a large potential segment of the population of mobile devices can be efficiently distributed and used. That can especially be advantageous when a creator of such a service can use self-serving meta-data associated with the service, hoping for increased viewership or usage.

According to one aspect, a method is provided for selectively receiving broadcast of one or more content items associated with a service to provide a unicast or multicast user experience. The method can comprise detecting a characteristic of a service, or detecting a characteristic of one or more content items, wherein the one or more content items are associated with the service, and wherein the characteristic is generated by a mobile operator and pertains to an objective measure of current user interest. The method may further comprise selectively receiving by broadcast, to a mobile device, one or more content items associated with the service based on the characteristic. Moreover, the method may comprise storing the one or more content items associated with the service for access through a user interface of the mobile device.

Another aspect relates to at least one processor configured to selectively receive broadcast of one or more content items associated with a service to provide a unicast or multicast user experience. The at least one processor can a first module for detecting a characteristic of a service, or detecting a characteristic of one or more content items, wherein the one or more content items are associated with the service, and wherein the characteristic is generated by a mobile operator and pertains to an objective measure of current user interest. Furthermore, the at least one processor can a second module for selectively receiving by broadcast, to a mobile device, one or more content items associated with the service based on the characteristic. Moreover, the at least one processor can a third module for storing the one or more content items associated with the service for access through a user interface of the mobile device.

Still another aspect relates to a computer program product comprising a computer-readable medium. The computer-readable medium can include a first set of codes for causing a computer to detect a characteristic of a service, or detect a characteristic of one or more content items, wherein the one or more content items are associated with the service, and wherein the characteristic is generated by a mobile operator and pertains to an objective measure of current user interest. Furthermore, the computer-readable medium can include a second set of codes for causing the computer to selectively receive by broadcast, to a mobile device, one or more content items associated with the service based on the characteristic. Moreover, the computer-readable medium can include a third set of codes for causing the computer to store the one or more content items associated with the service for access through a user interface of the mobile device.

Yet another aspect relates to an apparatus. The apparatus can include means for detecting a characteristic of a service, or detecting a characteristic of one or more content items, wherein the one or more content items are associated with the service, and wherein the characteristic is generated by a mobile operator and pertains to an objective measure of current user interest. Furthermore, the apparatus can comprise means for selectively receiving by broadcast, to a mobile device, one or more content items associated with the service based on the characteristic. Moreover, the apparatus can comprise means for storing the one or more content items associated with the service for access through a user interface of the mobile device.

Another aspect relates to an apparatus. The apparatus can include a communication module for detecting a characteristic of a service, or detecting a characteristic of one or more content items, wherein the one or more content items are associated with the service, and wherein the characteristic is generated by a mobile operator and pertains to an objective measure of current user interest. Furthermore, the apparatus can comprise a receiver for selectively receiving by broadcast, to a mobile device, one or more content items associated with the service based on the characteristic. Moreover, the apparatus can comprise a user interface for accessing at least one of the one or more content items associated with the service.

In yet another aspect, a method is provided for broadcast of a service to provide a unicast or multicast user experience. The method can comprise assigning a characteristic a service, or to one or more content items, wherein the one or more content items are associated with the service, and wherein the characteristic pertains to an objective measure of current user interest. The method can further comprise transmitting the at least one of the one or more content items associated with the service for selective reception by a mobile device based upon the characteristic and for playing the at least one of the one or more content items associated with the service on a user interface of the mobile device.

Yet another aspect relates to at least one processor configured to broadcast a service to provide a unicast or multicast user experience. The at least one processor can include a first module for assigning a characteristic a service, or to one or more content items, wherein the one or more content items are associated with the service, and wherein the characteristic pertains to an objective measure of current user interest. The at least one processor can further include a second module for transmitting the at least one of the one or more content items associated with the service for selective reception by a mobile device based upon the characteristic and for playing the at least one of the one or more content items associated with the service on a user interface of the mobile device.

Yet another aspect relates to a computer program product comprising a computer-readable medium. The computer-readable medium can include a first set of codes for causing a computer to assign a characteristic a service, or to one or more content items, wherein the one or more content items are associated with the service, and wherein the characteristic pertains to an objective measure of current user interest. The computer-readable medium can further include a second set of codes for causing the computer to transmit the at least one of the one or more content items associated with the service for selective reception by a mobile device based upon the characteristic and for playing the at least one of the one or more content items associated with the service on a user interface of the mobile device.

Yet another aspect relates to an apparatus. The apparatus can include means for assigning a characteristic a service, or to one or more content items, wherein the one or more content items are associated with the service, and wherein the characteristic pertains to an objective measure of current user interest. The apparatus can further include means for transmitting the at least one of the one or more content items associated with the service for selective reception by a mobile device based upon the characteristic and for playing the at least one of the one or more content items associated with the service on a user interface of the mobile device.

Yet another aspect relates to an apparatus. The apparatus can include a computing platform for assigning a characteristic of a service, or to one or more content items, wherein the one or more content items are associated with the service, and wherein the characteristic generated by a mobile operator pertains to an objective measure of current user interest. The apparatus can further include a transmitter for transmitting the one or more content items associated with the service for selective reception by a user mobile device based upon the characteristic and for playing the at least one of the one or more content items associated with the service on a user interface of the mobile device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The foregoing aspects of the embodiments described herein will become more readily apparent by reference to the following detailed description when taken in conjunction with the accompanying drawings wherein.

DETAILED DESCRIPTION

Figure 1:
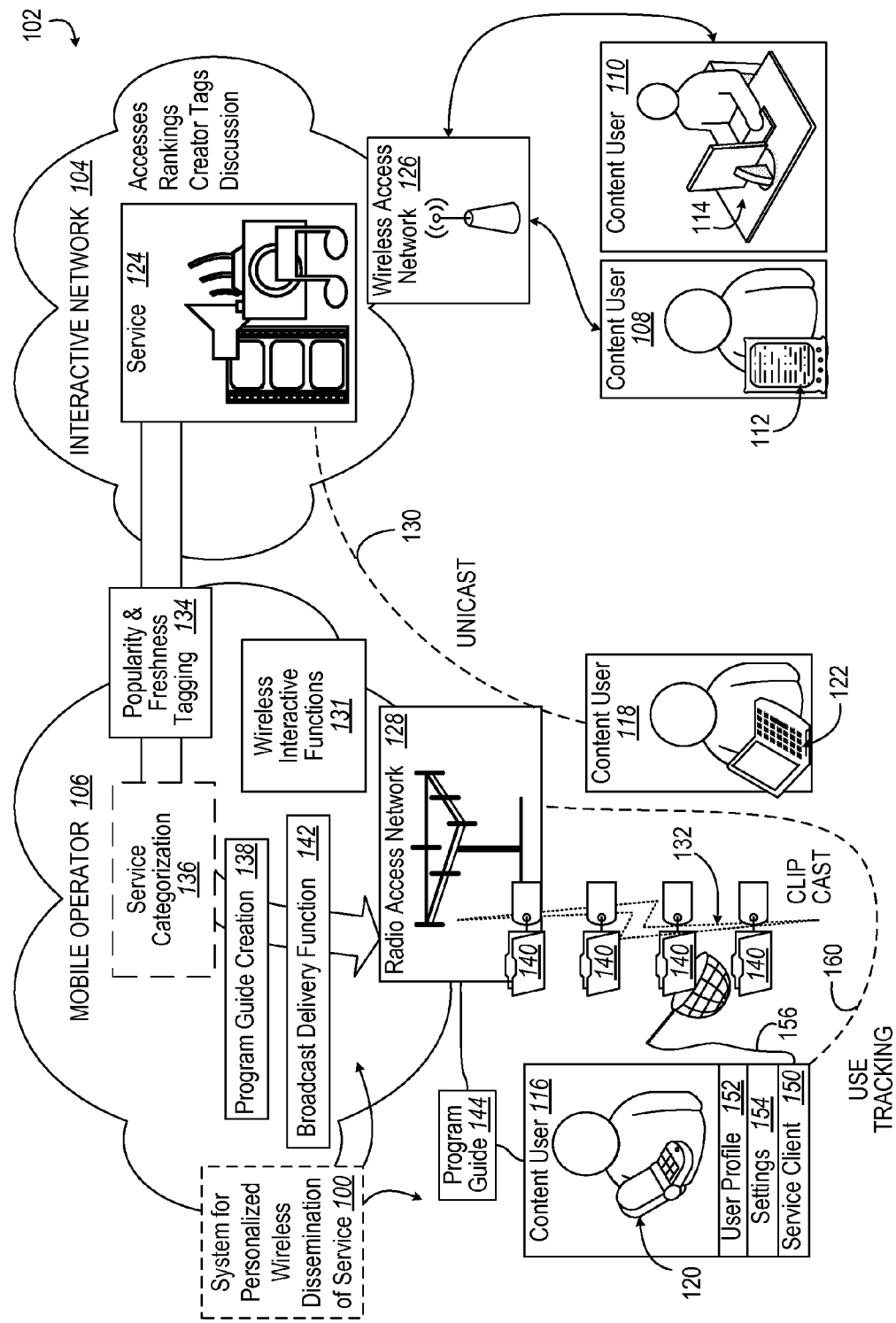
FIG. 1 depicts a block diagram of a system for personalized wireless dissemination of content items associated with a service operating across a communication network.

For convenience and clarity, unicast as used herein refers to sending information packets to a single destination. While such transmissions may be picked up by multiple receivers, only the addressed receiver digests the data. Physically, messages are directed only over those links in a network required to achieve delivery, thereby limiting the number of devices on the network that actually receive the messages to a minimum. Unicast allows a single user to personalize receiving data on the fly. Web browsing to a particular streamed media clip is an example of unicasting.

Multicast as used herein refers to transmitting information packets addressed to a range of receivers. Multicast is typically implemented on an otherwise unicast-based network using network addressing methods for the delivery of information to a group of destinations concurrently. Multicast methods strive for efficiency through delivering the messages over each link of the network only once, creating copies only when the links to the multiple destinations split, typically at network switches and routers. Multicast is often used for streaming media and Internet television applications where the media is streamed to all requesting users in substantially the same time frame. An example is a group selecting to receive streaming video of a live performance or sports event.

Broadcast as used herein refers to transmitting information, which in some but not all instances can be packetized, to all units capable of receiving the transmission without distinction. Over-the-air television and radio are particular examples of broadcast networks. For example, everybody tuned to channel 8 receives the same signal at the same time with the transmission time chosen by the broadcaster rather than the user. Broadcast networks are usually physically separate from unicast based networks as, generally, one-to-many transmissions of data is not efficient on a unicast based network. Broadcast networks are also generally thought of as being one-way communication paths.

To provide more of a user-directed unicast or multicast content receiving experience without the corresponding network resource scalability constraints, services such as Media-FLO™ system provided by QUALCOMM CORPORATION®, San Diego, Calif., provide a one-to-many content or media broadcast capability. It is to be noted that most digital video broadcasting networks, like MediaFLO and DVH-H, use digital rights management systems to prevent the decoding of the received data absent subscriptions. In some ways this mimics functionality of multicast systems in that only those users electing (e.g. paying) to receive the content can view the content. In some aspects, these services are focused on delivering live performance broadcasts of general appeal that users manually select to view.

The present innovation can mimic functionality found on multicast and unicast systems while benefiting from the transmission efficiency of broadcast. It is made to appear to a user that he is receiving content associated with a service broadcast just for him or her at a time of his or her choosing, even though in reality he or she is watching content that has been recorded based on popularity and freshness metadata, as described herein.

In particular, a service mobile distribution system supports creation of a personalized and virtual service broadcast that can be selectively clipped and cached by filtering at a user terminal based, for example, on content descriptors of popularity or freshness. A service provider can further provide meta-data categorization for filtering content items associated with the service. A service program guide enables mobile devices to schedule clip downloads ("clipping"). Popularity, which can be sorted by applicable demographic, represents a criterion (e.g., rating scores, rankings among a certain grouping, number of views, quantity of online discussion, reliability of criterion etc.) used in determining whether the associated content item should be downloaded ("clipped") for subsequent accessibility by a user, enhancing filtering based upon user profile, genre, etc. Freshness represents how recent the associated content was made available for download by the broadcast service provider, which can also be a filtering criterion. The plurality of popularity criterion can also be used, separately or together, as weighting to sort a display of cached content items associated with a service.

As discussed above, the present methods and apparatus include enhancing electronic service guide support for acquisition and display of broadcast distribution of a personalized service with associated content items. In one aspect, the service may provide a channel including User Generated Content (UGC). In such an aspect, the UGC may include metadata to facilitate enhanced filtering, sorting, etc. The resulting personalized UGC cache may be regarded as a virtual UGC service (e.g. channel) tailored to the end user's interests or preferences.

In mobile broadcast services, metadata associated with the content items (content description, targeted user profile, targeted user location, etc.) can be made available to enable personalized reception of select content items associated with a service. Specifically, for clip cast delivery of content items associated with a service, filter metadata in the form of "popularity" and "freshness" can be added to the (Electronic) Service Guide or (E)SG in the creation of a personalized content cache on the terminal. 'Popularity' for a service can be expressed as an aggregate rating score of a service, provided by other viewers, of affiliated content items, or by a count of recorded views of content items associated with the service. 'Freshness' indicates how long ago such a service has been made available for broadcast distribution. The terminal may use the metadata contained in these filters, possibly in conjunction with other (E)SG data, and in accordance to stored user preference/user profile information, to decide whether or not to acquire a particular clip. The user, when launching the service of his/her subscribed mobile broadcast service, sees a listing of available associated content items for rendering, and can choose the desired content item(s) for rendering. Furthermore, this innovation presents a means for presentation to the user, a display list of the available cached content items associated with a service, in which the order of the content items are weighted by popularity.

Although this description focuses on personalizing delivery of content items associated with a service through broadcast distribution, the methods described herein apply to general file content, such as movie or TV program clips, delivered over the clip cast service. For the clip cast service (called "cachecast" in OMA BCAST), filter metadata in the form of "popularity" and "freshness" can be added to the (Electronic) Service Guide or (E)SG in the creation of a personalized content cache on the terminal. Examples of well-known industry specifications of (E)SGs are the OMA BCAST Service Guide, the DVB IPDC Electronic Service Guide, and the FLO Forum System Information (SI). 'Popularity' of the service can be expressed as an aggregate rating score of the affiliated content item provided by other viewers, or by a count of recorded views of that content item. The "popularity" filter represents usage/rating related information obtained from various sources. For example, these may represent a) rating data provided directly by the service provider, b) usage statistics measured for the mobile broadcasting entity itself (e.g. Verizon Wireless) via user feedback derived from service interaction, c) a mixture of the above two metrics, or d) some other source and criteria. Furthermore, popularity ratings may be "flat," "sorted" or "weighted." The "flat" category corresponds to rating information collected from all reviewers without distinction. The "sorted" category represents ratings provided by reviewers categorized as belonging to specific "domains", which are classified by metrics such as demographics, user preferences, affinity groups, professional affiliations, etc. In the form of professional reviewer rating information, 'popularity' could also be used to filter other "regular" content, such as movies, TV programs, etc. The "weighted" category represents ratings provided through application of predefined weighting values applied to at least a portion of obtained criterion to bias results towards or away from certain content. For example, a user may provide weighting values to bias results towards content found popular by specific groups or entities. In another example, a service may provide weighting values to bias results towards newly produced content associated with the service. 'Freshness' indicates how long ago such a service or content items associated with the service have been made available for broadcast distribution. The terminal may use the metadata contained in these filters, possibly in conjunction with other (E)SG data, and based on stored user preferences/user profiles, to decide whether or not to acquire (download and cache) a particular content item associated with a service. The user, when launching the clip cast service of his/her subscribed mobile broadcast service, sees a listing of available clips for rendering. He/she can subsequently choose the desired clip(s) for presentation. In addition, this innovation presents a means for presentation to the user, a display list of the available cached content items associated with a service, in which the order of the content items are weighted accordingly.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, or a computer. By way of illustration, both an application running on a computing device and the computing device can be a component. One or more components can reside within a process or thread of execution and a component may be localized on one computer or distributed between two or more computers. In addition, these components can execute from various computer readable media having various data structures stored thereon. The components may communicate by way of local or remote processes such as in accordance with a signal having one or more data packets, such as data from one component interacting with another component in a local system, distributed system, or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. or may not include all of the devices, components, modules etc. discussed in connection with the figures. A combination of these approaches may also be used.

Turning to the Drawings, in FIG. 1, a system 100 for personalized wireless dissemination of a service operates across a communication network 102 that encompasses an interactive network 104 and a mobile operator network 106. The interactive network 104 can be substantially or wholly outside of the mobile operator network 106, for example comprising a large terrestrially-based private or public data packet communication network serving content users 108, 110 of computing devices 112, 114. Alternatively or in addition, content users 116, 118 of fixed or mobile communication devices 120, 122 respectively can perform over-the-air two-way data communication with the interactive network 104 via the mobile operator network 106.

Interactive network 104 may include one or more services 124. In one aspect, a service represents a bundle of content items, which may form a logical group to an end-user 108, 110, 116, 118. For example, a service may be a TV channel, composed of several TV shows. Content users 108, 110, 116, 118 can access, download, interact with, post discussion entries about, provide a rating, etc., that give indications about the popularity of a particular service 124. For example, the content user 116, 118 can utilize their respective communication devices 120, 122 via a unicast communication channel 130 supported by a wireless interactive services component 131.

Service 124 can have useful meta-data associated with it. In one aspect, service 124, may include a service fragment. In such an aspect, a service fragment may include meta-data describing the service. In one aspect, meta-data from content items associated with the service may be linked to the service meta-data thereby allowing the associated content items to inherit the meta-data setting of service 124. In another aspect, a content item associated with service 124 may be given a different setting for a meta-data criterion if that meta-data criterion differs from the overall value of service 124. For example, a popular content item associated with service 124 may have a higher popularity rating than the service as a whole. Additionally, meta-data for service 124 may be derived from an aggregation of meta-data results of associated content items. In one aspect, such an aggregation may be any one of a simple average, a time weighted average, a service provider defined weighted average, or any other derived number that is a function of an aggregation of data, etc.

To objectively and accurately characterize service 124 for determination of a user's potential interest in downloading by broadcast channel 132, system 100 has a popularity and freshness tagging component 134 that can associate each service 124 or content items associated with service 124 with objectively discernable attributes. In addition, a service categorization component 136 can associate and tag the service 124 or content items associated with service 124 with other genre and type attributes that pertain to the nature of the service 124 directly or pertain to a demographic group that would tend to be interested in such content. For example, service categorization component 136 may categorize a service 124 with a focus towards baseball content items with a service 124 with a focus towards football content items.

Based upon the available service 124, a program guide creation component 138 can select a sequence of content items 140 associated with service 124 for distributing by a broadcast delivery services component 142 over the broadcasting channel 132 transmitted by the RAN 128. In one aspect, this sequence is described in a schedule of a distributed program guide 144 received by the communication device 120. Program guide 144 may be generated at least in part through use of service 124 meta-data. A service client 150 executed by the device 120 receives and facilitates establishment of a user profile 152 and user settings 154 that provide guidance for selective reception ("clip casting") of respective ones of the sequence of content items 140 associated with service 124. Thereby, a communication device 120 with constrained available cache storage, portable power, or processing capacity can judiciously select content items 140, depicted at 156. The user 116 subsequently can interact with the cached clips via a graphical user interface (GUI) 158. The system 100 can refine its popularity assessment by receiving use tracking, depicted at 160, from communication device 120 via the RAN 128 and wireless interactive services component 131.

Figure 2:
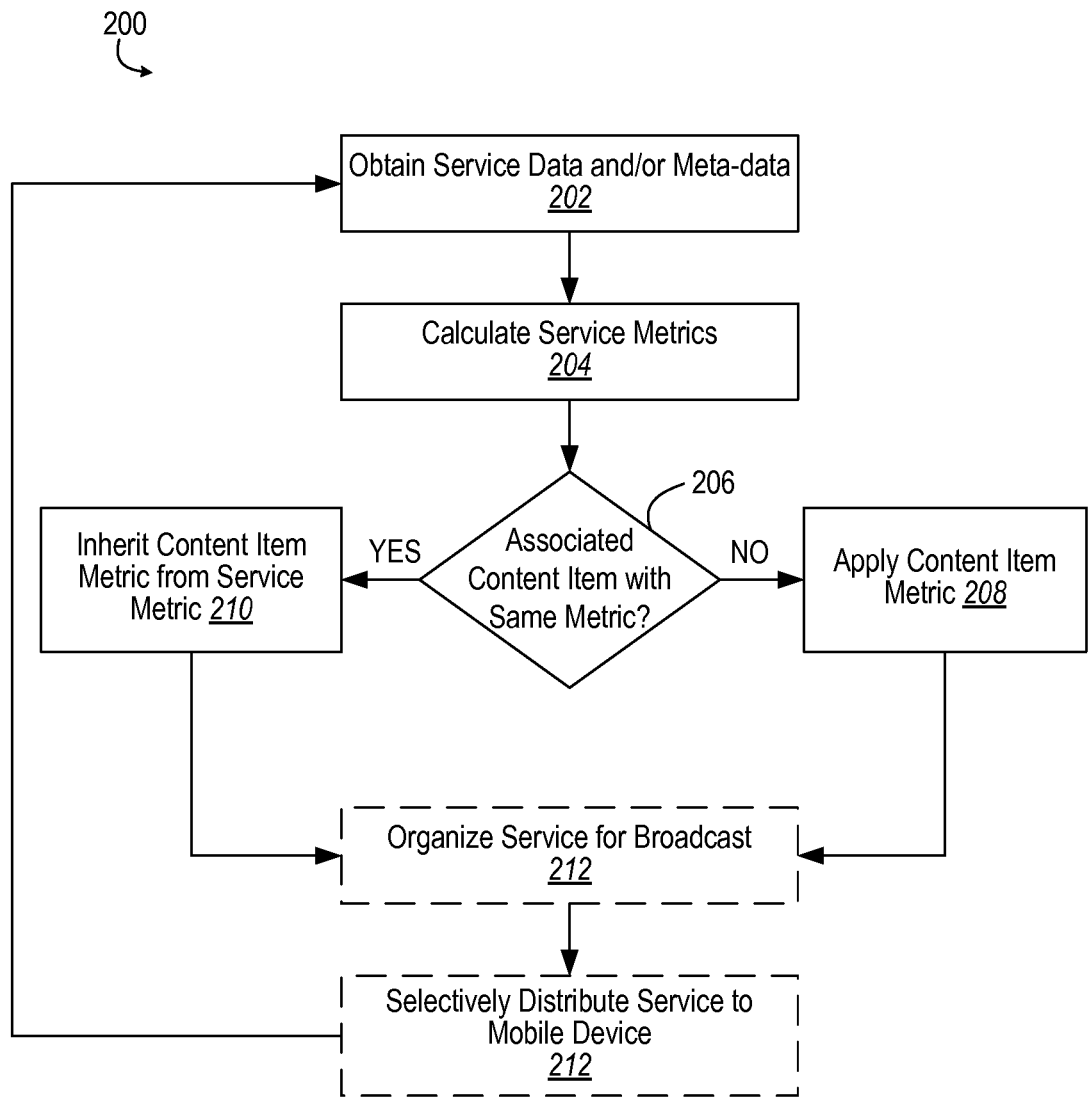
FIG. 2 depicts a flowchart of a methodology for personalized wireless dissemination of a service performed between a communication network of a mobile device and a mobile broadcast delivery service.

In FIG. 2, a methodology 200 for personalized wireless dissemination of content items associated with a service is depicted. In one aspect, a service client may be deployed, installed or activated on a mobile device. Each mobile device may receive a program guide. A mobile broadcast delivery service may access content items associated with a service from external sources. At reference numeral 202, service data may be obtained by tagging or tracking the popularity, freshness or other attributes of content items associated with the service.

At reference numeral 204, tagged and tracked metrics, such as but not limited to, popularity, freshness, or other meta-data associated with content items or a service may be calculated. In an illustrative aspect, popularity may be determined by some combination of factors such as volume of discussion entries associated with the content items or service, rating by users of the content items or service, and a number of accesses, downloads, or interactions with the content items or service. At reference numeral 206, it is determined whether a content item metric is substantially similar to the corresponding metric for the associated service. If at reference numeral 206, it is determined that the content item metric is not substantially similar to the service metric; then at reference numeral 208 the content item applies the metric value to the content item tag (e.g. content fragment). By contrast, if at reference numeral 210, it is determined that the content item metric is not substantially similar to the service metric, then at reference numeral 210 the content item tag inherits the service item tag (e.g. service fragment). In one aspect, meta-data from content items associated with the service may be linked to the service meta-data thereby allowing the associated content items to inherit the meta-data setting of service item. As such, each content item may inherit substantially similar metrics from the service with which the content item is associated.

In one aspect, at reference numeral 212, the service may be organized or prioritized to prepare available content items associated with the service for broadcast. For instance, characteristics of the population of devices can be correlated to available content with more appropriate (i.e., highly correlated) being given priority. In an illustrative aspect, priority can be given to more popular or fresher content items, especially for predominant demographics for a population serviced by the service. Priority can be adjusted by tracking of those who have had an opportunity previously to receive the content item or that have actually received the content item or similar content. In one aspect, multiple weights may be applied to various service metrics to prioritize the associated content. Such weighting factors may used to bias results towards or away from certain content items associated with a service. For example, a user may provide weighting values to bias results towards content found popular by specific groups or entities. In another example, a service may provide weighing values to bias results towards newly produced content associated with the service. The program guide may be updated to reflect the scheduling per this prioritization. Notifications of such updates are sent from the service to the mobile device.

After receiving the notifications of the updates to the program guide, a mobile device can delete obsolete portions; as such storage space can be made available to download a future portion of the guide.

However the program guide is obtained (e.g., unicast, downloaded from the broadcast, etc.), upcoming clips that are deemed appropriate for the user are selected for being captured upon a scheduled future broadcast. Since user-generated content often lacks a degree professionalism in its creation and in its characterization by its creator, the communication device benefits from characterization by the mobile service, in particular popularity and freshness. The advance notice of what is to be broadcast allows the mobile device to determine its needs for additional content clips in advance and to still benefit from power savings and reduced processing demands in not having to monitor a service continually.

In one aspect, at reference numeral 212, in accordance with a notification of the updated program guide, a sequence of content items associated with a service and updated portions of the program guide may broadcast OTA to multiple mobile devices. Each mobile device in turn may select certain clips for reception, beginning by scheduling to wake up and receive an updated portion of the program guide. A determination of the user setting may be made as they pertain to the scheduled broadcast of at least a portion of a service. Service or content tags of these scheduled content items are matched to a user settings and profile. Responsive to matches/prioritization/weighting, selected content items may be received from the broadcast. Subsequently, the mobile device 204 affords an opportunity for the user to interact with cached clips.

User interactions, which can include failing to avail themselves of repeated offerings of a particular content item, can be tracked and reported to the provider. The provider 206 can update the popularity tags of particular content items or service based upon these reports from the mobile devices. The provider may reprioritize subsequent rebroadcasts based upon the updated popularity tags. The usage of the content items can also provide a basis for subscriber transaction processing, such as noting whether a user has exceeded certain subscription thresholds for content item use.

Figure 3:
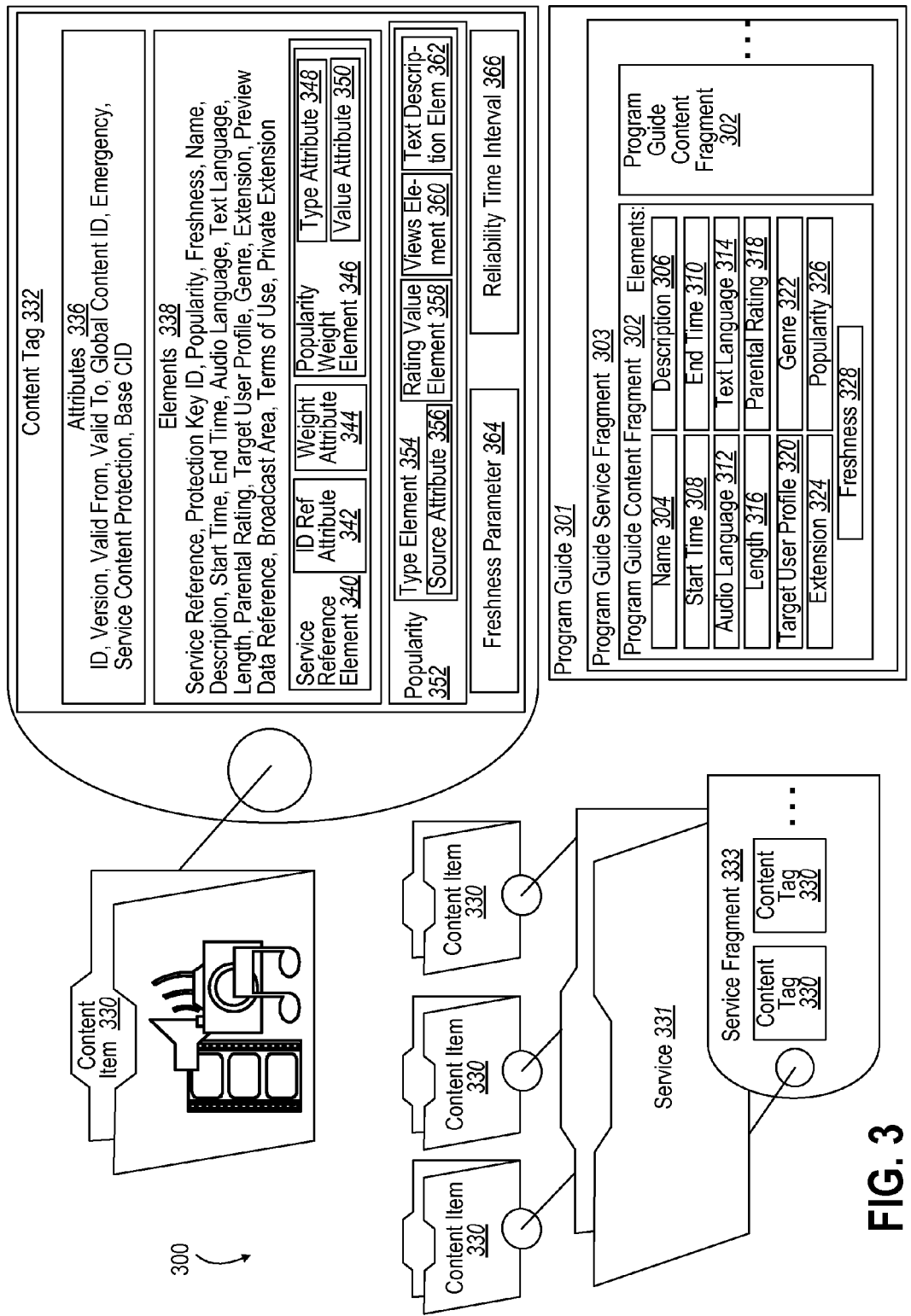
FIG. 3 depicts a block diagram of an over-the-air data structure of an updated program guide portion, a service fragment, a content item, and an associated content item tag.

In FIG. 3, a broadcast segment 300 can comprise a program guide 301 sent in its entirety or sent sequentially as a plurality of program guide content fragments 302 having elements of a clip name 304, description 306, start time 308, end time 310, audio language 312, text language 314, length 316, parental rating 318, target user profile 320, genre 322, extension (e.g., file type) 324, popularity 326 (which can be dissected by particular demographic segments), and freshness 328, or program guide service fragments 303 having elements substantially similar to elements recited above with reference to program guide content fragments 302. In one aspect, program guide content fragments 303 inherit (e.g. link to) associated elements in program guide service fragments 303. In such an aspect, program guide content fragments 303 may default to link to associated elements in program guide service fragments 303 unless the content item differs with respect to the service for one of the elements. Such linkage may reduce program guide size and thereby may allow for more efficient delivery or storage of program guide 301. In one aspect, meta-data from program guide content items associated with the program guide service item may be linked to the program guide service meta-data thereby allowing the associated program guide content items to inherit the meta-data setting of the program guide service item. The program guide elements can be for user interpretation enabling a content creator to provide user readable information about the service. A mobile device can use these guide elements for selecting content items associated with a service for downloading, caching, and presentation to a user as well as providing characterizations useful for sorting and searching. For example, the user may choose to provide settings based on these elements for prospectively downloading or for retroactively sorting and searching.

The segment 300 can also include a content item 330 associated with a content item tag 332 having attributes 336 of ID, version, valid from, valid to, global content ID, emergency, service content protection, and base CID. The content item tag 332 has elements 338 of service reference, protection key ID, popularity, freshness, name, description, start time, end time, audio language, text language, length, parental rating, target user profile, genre, extension, preview data reference, broadcast area, terms of use, and private extension.

In one aspect, a service reference element 340 can be used for ordering of displays of this content item tag 332 relative to other content item tags belonging to the same service as presented to the content user. To that end, the service reference element 340 has an ID reference attribute 342, a weight attribute 344, and a popularity weight element 346 having a type 348 and a value attribute 350. This illustrative data structure provides a weight attribute that can be used to order display/presentation of a specific content item relative to other content items. Additionally, or in the alternative, content item tag 332 or service reference element 340 may be linked to a service 331 from which content item attributes 336 or elements 338 may be inherited. Further, in one aspect, service 331 may include service fragment 333 that may include multiple content tags 332 or reference to content tags 332. As such, any attributes, elements or the like, associated with content tag 332 may be derived from or associated with a linkage to service fragment 333. In one aspect, meta-data from content tags associated with the service fragment may be linked to the service fragment meta-data thereby allowing the associated content tags to inherit the meta-data setting of service fragment.

The content item tag 332 can comprise a popularity element 352 having a type element 354, which has a source attribute 356, a rating value element 358, views element 360, and a text description element 362. This data structure can facilitate a "popularity rating" representing filter criteria for a mobile device or terminal to decide whether the associated content item should be downloaded and cached for subsequent accessibility by the user. Such filtering, including information such as rating scores or number of views, can complement existing filters such as targeted user profile and genre and can be useful in filtering content delivered over a broadcast service channel for creation of personalized service cache. The popularity filtering can represent information obtained directly from the content provider, usage statistics measured by a mobile broadcast service itself, or a combination thereof. Popularity ratings can be flat, sorted, or weighted. Flat pertains to raw rating information collected from all viewers, sorted dissects this information for certain classifications of users, and weighted provides possible predefined multiple weighting values to be applied to at least a portion of flat or sorted data to bias results towards or away from certain content or criterion. For example, sorted ratings can be classified by metrics such as demographics, user preferences, affinity groups, professional affiliations, etc. In another example, a user may provide weighting values to bias results towards content found popular by specific groups or entities. In still another example, a service may provide weighting values to bias results towards newly produced content associated with the service. Popularity can encompass professional reviewer rating information.

The content item tag 332 can further comprise a freshness parameter 364 that represents how recently the associated content item was made available for download by the broadcast service provider and could be used for filtering purposes.

In one aspect, content item tag 332 can further comprise a sampling time parameter that represents a time when the popularity characteristic was generated. In such an aspect, the sampling time may provide a user with additional insight into the content item and/or service. For example, if the sampling time is close an original broadcast date, then any associated popularity information may not capture a broad picture of the contents popularity. In another example, if the sampling time is relatively old, then a user may infer that any associated popularity information may be stale and/or unreliable.

In another aspect, content item tag 332 can further comprise a reliability time interval parameter 366 that represents a time interval between a broadcast date of the service or content item and a sampling date of an element, popularity, etc., for the service or content item. In one aspect, reliability time interval parameter 366 may be useful in providing additional insight for a user, provider, etc., with respect to various elements. For example, a comparison of the volume of discussions postings associated with a service divided by the reliability time interval 366 results in a volume of discussions per time interval characteristic. In another example, a comparison of the plurality of ratings associated with the service divided by the reliability time interval 366 results in a rating per time interval characteristic. In yet another example, a comparison of the number of times the service was accessed against the reliability time interval 366 results in a number of accesses per time interval characteristic. In one aspect, the reliability time interval 366 may be segmented into predetermined subintervals. In such an aspect, each of the segments may be weighted differently to preferentially bias the relatively recent segments.

Figure 4:
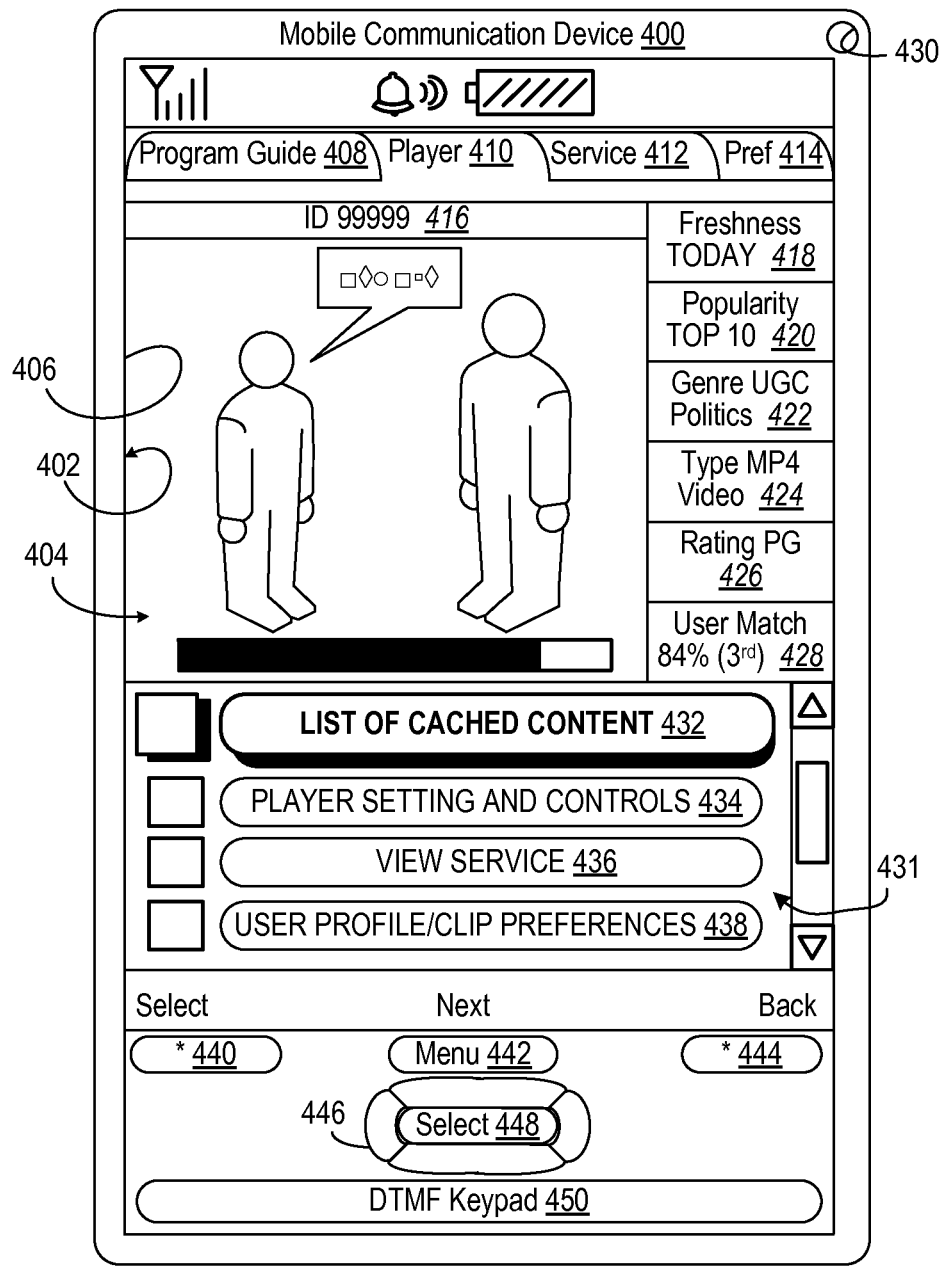
FIG. 4 depicts a diagram of a mobile communication device that provides an exemplary GUI for interacting with personalized content items associated with a service.

In FIG. 4, a mobile communication device 400 provides an exemplary GUI 402 for interacting with personalized service including associated content 404. An output device is depicted as a graphical display 406 that presents a program guide tab 408, a content player tab 410, a service tab 412, and a preference tab 414. The graphical display 406 also renders a content item as depicted at 416. In one aspect, content item 404 is associated with a service. In some aspects, attributes of the rendered content item 416 or associated service are displayed, such as a freshness attribute "Today" 418, a popularity attribute "Top 10" 420, a genre of "Politics" 422, a type attribute "MP4 Video" 424, a rating attribute of "PG" 426, and a user correlation match "84%" 428. It should be appreciated that the GUI 402 may further include an audible output 430 and can further include a haptic output (not shown).

The GUI 402 may further include an input device, such as a touch screen portion 431 of the display 406 that may depict other features, such as a list of cached content option 432 that is highlighted, a player setting and control option 434, a view service option 436, and a user profile/clip preference option 438. In the illustrative depiction, physical input buttons are also provided, which may include but are not limited to a left select button 440, a center menu select button 442, a right back select button 444, cursor keys 446, select key 448, and a dial tone multifunction (DTMF) keypad 450.

Figure 5:
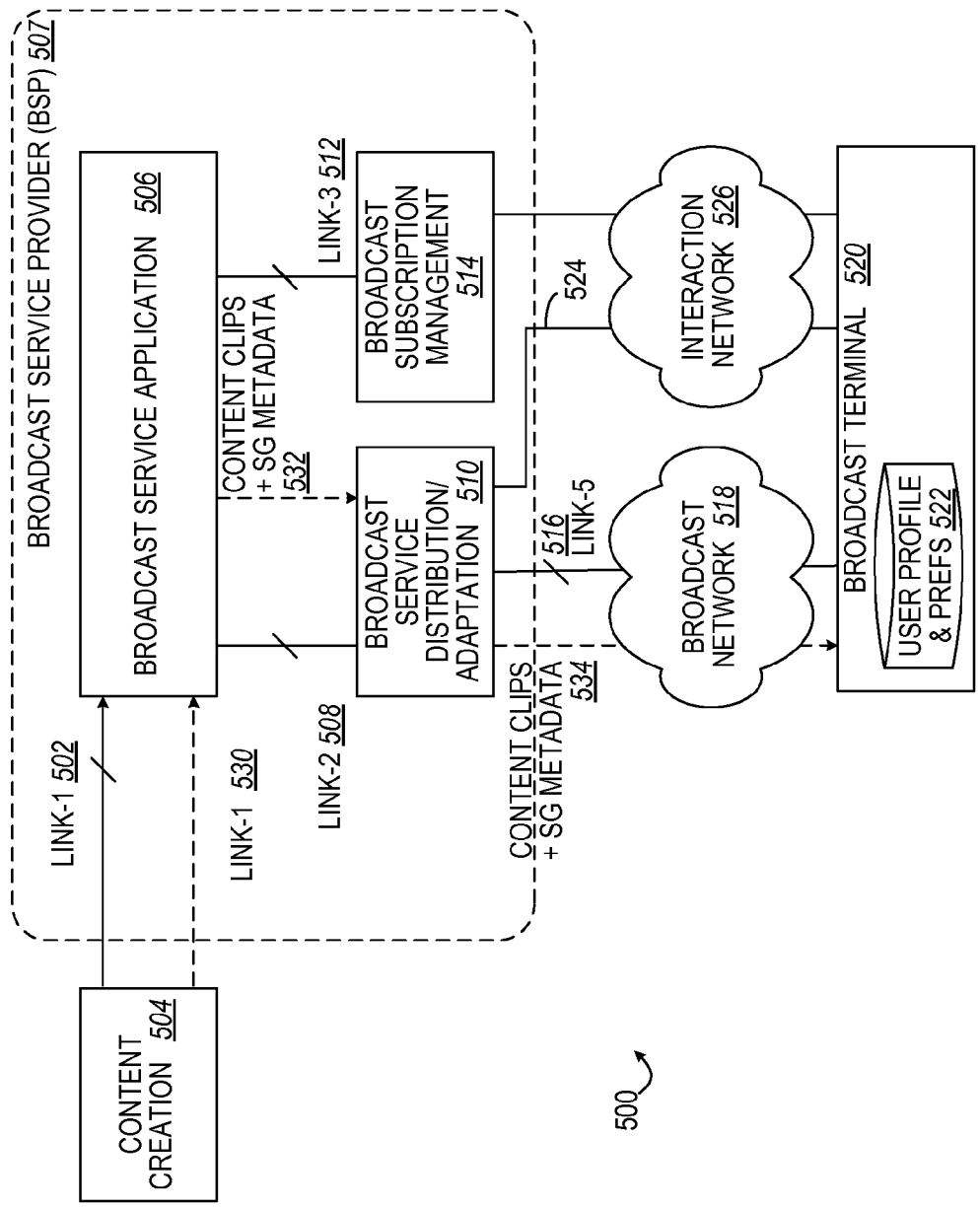
FIG. 5 depicts a block diagram of a mobile network for broadcasting.

In FIG. 5, a mobile network 500 for broadcasting provides a link-1 interface 502 to transmit institutionally created content associated with a service from a content creation component 504 to a broadcast service application 506 of a broadcast service provider 507. A link-2 interface 508 passes content from the application 506 to a broadcast service distribution/adaptation component 510. A link-3 interface 512 passes information about the content from the application 506 to a broadcast subscription management component 514. The content adapted for broadcast is transmitted by the distribution/adaptation component 510 via link-5 interface 516 to broadcast network 518 for over-the-air (OTA) transport to a broadcast-receiving terminal 520. The broadcast-receiving terminal 520 can selectively receive and cache such content in accordance with a user profile and preferences data structure 522. Information about this broadcasting is made available to an interaction network 526 for certain interactions with broadcast-receiving terminals 520. The broadcast subscription management component 514 can also provide information regarding receipt of broadcast via the interaction network 526 (e.g., acceptance of terms, return of decryption keys, etc.) to the broadcast terminal 520.

Advantageously, the mobile network 500 can facilitate one-to-many distribution of at least a portion of a service from the content creation component 504 via a link-1 interface 530 to the broadcast service application 506, which in turn passes content items associated with the service and program or service guide (SG) metadata as depicted at 532 to the distribution/adaptation component 510, which in turn passes content items associated with the service and SG metadata as depicted at 534 across the broadcast network 518 to the broadcast-receiving terminal 520.

Figure 6:
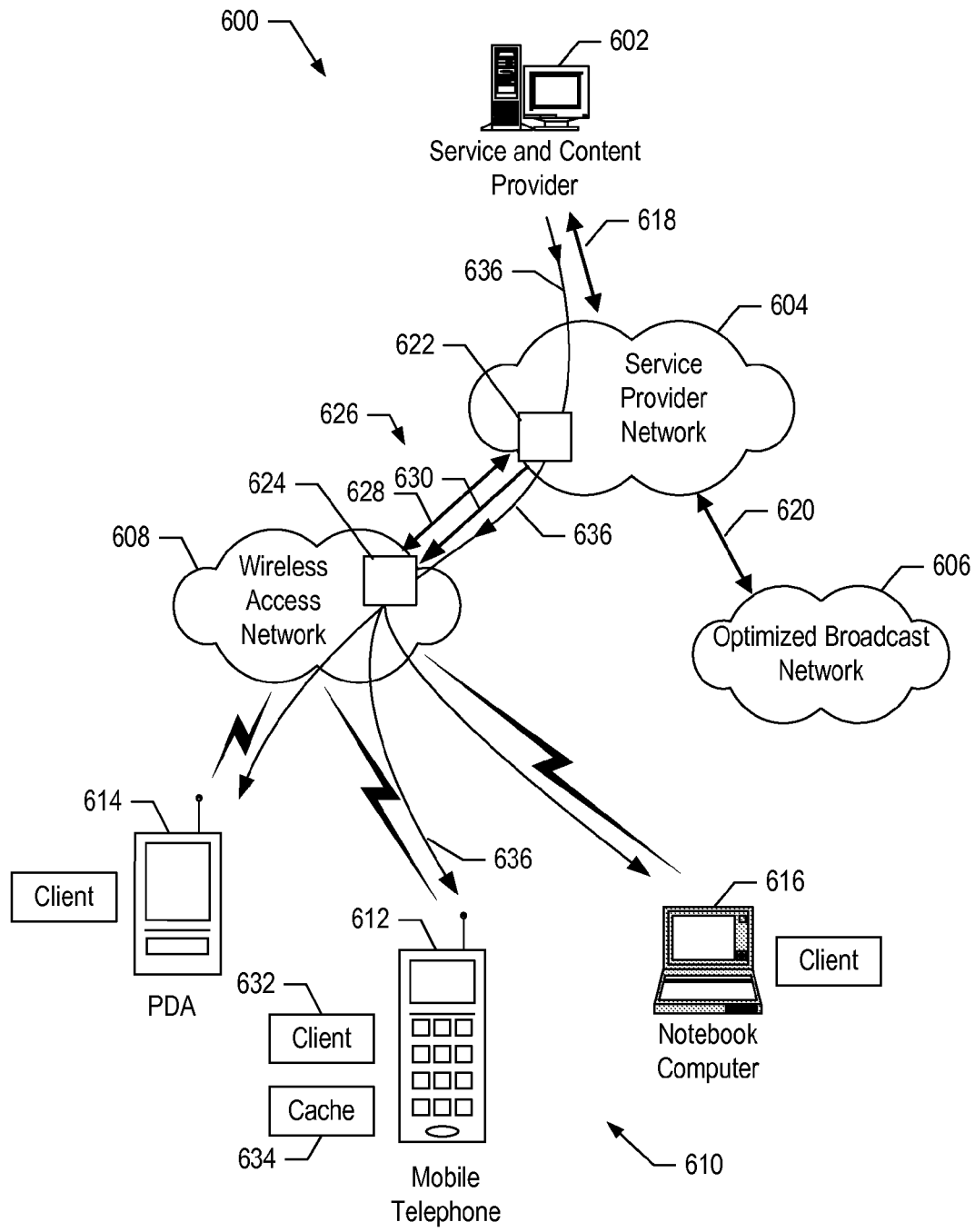
FIG. 6 depicts a block diagram of an exemplary communication network that comprises one aspect of a transport system that operates to create and transport multimedia content flows across data networks.

FIG. 6 depicts an exemplary communication network 600 that comprises one aspect of a transport system that operates to create and transport multimedia content items associated with one or more services across data networks. For example, the transport system is suitable for use in transporting content clips associated with one or more services from a service and content provider network to a wireless access network for broadcast distribution.

The network 600 comprises a service and content provider (SCP) 602, a service provider network 604, an optimized broadcast network 606, and a wireless access network 608. The network 600 also includes devices 610 that comprise a mobile telephone 612, a personal digital assistance (PDA) 614, and a notebook computer 616. The devices 610 illustrate just some of the devices that are suitable for use in one or more aspects of the transport system. It should be noted that although three devices are shown in FIG. 6, virtually any number of devices or types of devices are suitable for use in the transport system.

The service content provider 602 operates to provide content items associated with one or more services for distribution to users in the network 600. The content comprises video, audio, multimedia content, clips, real-time and non real-time content, scripts, programs, data or any other type of suitable content. The service content provider 602 provides the content to the service provider network 604 for distribution. For example the service content provider 602 communicates with the service provider network 604 via the communication link 618, which comprises any suitable type of wired or wireless communication link.

The service provider network 604 comprises any combination of wired and wireless networks that operate to distribute content for delivery to users. The service provider network 604 communicates with the optimized broadcast network 606 via the link 620. The link 620 comprises any suitable type of wired or wireless communication link. The optimized broadcast network 606 comprises any combination of wired and wireless networks that are designed to broadcast high quality content. For example, the optimized broadcast network 606 may be a specialized proprietary network that has been optimized to deliver high quality content to selected devices over a plurality of optimized communication channels.

In one or more aspects, the transport system operates to deliver content from the service content provider 602 for distribution to a content server (CS) 622 at the service provider network 604 that operates to communicate with a broadcast base station (BBS) 624 at the wireless access network. The CS 622 and the BBS 624 communicate using one or more aspects of a transport interface 626 that allows the service provider network 604 to deliver content in the form of content flows to the wireless access network 608 for broadcast/multicast to the devices 610. The transport interface 626 comprises a control interface 628 and a bearer channel 630. The control interface 628 operates to allow the CS 622 to add, change, cancel, or otherwise modify contents flows that flow from the service provider network 604 to the wireless access network 608. The bearer channel 630 operates to transport the content flows from the service provider network 604 to the wireless access network 608.

In one aspect, the CS 622 uses the transport interface 626 to schedule a content flow to be transmitted to the BBS 624 for broadcast/multicast over the wireless access network 608. For example, the content flow may comprise a non real-time content clip that was provided by the service content provider 602 for distribution using the service provider network 604. In one aspect, the CS 622 operates to negotiate with the BBS 624 to determine one or more parameters associated with the content clip. Once the BBS 624 receives the content clip, it broadcasts/multicasts the content clip over the wireless access network 608 for reception by one or more of the devices 610. Any of the devices 610 may be authorized to receive the content clip and cache it for later viewing by the device user.

For example the device 610 comprises a client program 632 that operates to provide a program guide that displays a listing of content items associated with one or more services that are scheduled for broadcast over the wireless access network 608. The device user may then select to receive any particular content items associated with one or more services for rendering in real-time or to be stored in a cache 634 for later viewing. For example the content clip may be scheduled for broadcast during the evening hours, and the device 612 operates to receive the broadcast and cache the content clip in the cache 634 so that the device user may view the clip the next day. Typically, the content item associated with a service is broadcast as part of a subscription plan and the receiving device may need to provide a key or otherwise authenticate itself to receive the broadcast.

In one or more aspects, the transport system allows the CS 622 to receive program-guide records, program contents, and other related information from service content provider 602. The CS 622 updates or creates content items associated with a service for delivery to devices 610.

Figure 7:
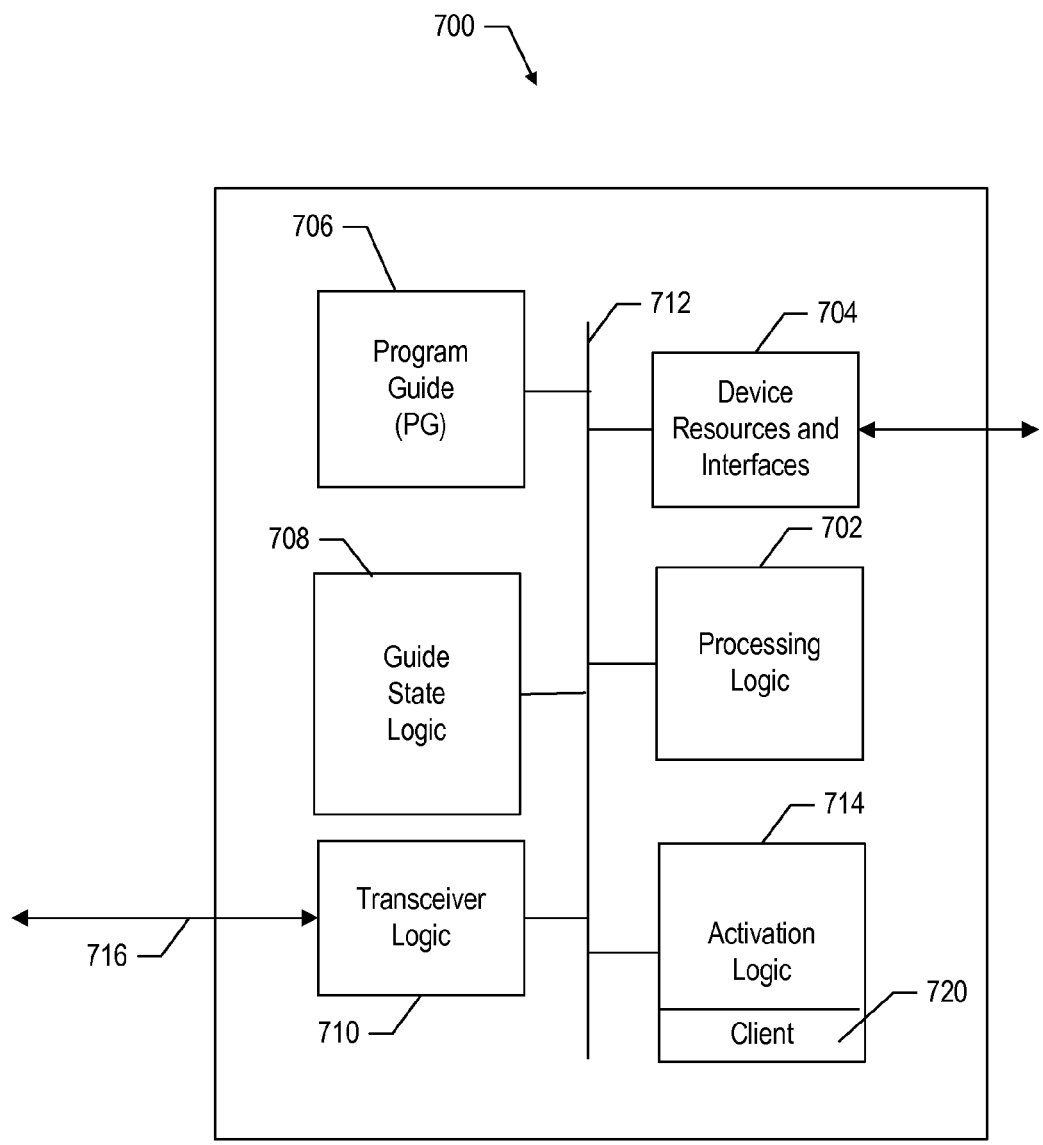
FIG. 7 depicts a block diagram of a content provider server suitable for use in one aspect of the content delivery system of FIG. 6.

FIG. 7 depicts one aspect of a content provider server 700 suitable for use in one aspect of the service delivery system. For example, the server 700 may be used as the server 602 in FIG. 6. The server 700 comprises processing logic 702, resources and interfaces 704, and transceiver logic 710, all coupled to an internal data bus 712. The server 700 also comprises activation logic 714, PG logic 706, and PG record logic 708, which are also coupled to the data bus 712.

In one or more aspects, the processing logic 702 comprises a CPU, processor, gate array, hardware logic, memory elements, virtual machine, software, or any combination of hardware and software. Thus, the processing logic 702 generally comprises logic to execute machine-readable instructions and to control one or more other functional elements of the server 700 via the internal data bus 712.

The resources and interfaces 704 comprise hardware or software that allows the server 700 to communicate with internal and external systems. For example, the internal systems may include mass storage systems, memory, display driver, modem, or other internal device resources. The external systems may include user interface devices, printers, disk drives, or other local devices or systems.

The transceiver logic 710 comprises hardware logic or software that operates to allow the server 700 to transmit and receive data or other information with remote devices or systems using communication channel 716. For example, in one aspect, the communication channel 716 comprises any suitable type of communication link to allow the server 700 to communicate with a data network.

The activation logic 714 comprises a CPU, processor, gate array, hardware logic, memory elements, virtual machine, software, or any combination of hardware and software. The activation logic 714 operates to activate a CS or a device to allow the CS or the device to select and receive content or services described in the PG 706. In one aspect, the activation logic 714 transmits a client program 720 to the CS or the device during the activation process. The client program 720 runs on the CS or the device to receive the PG 706 and display information about available content or services to the device user. Thus, the activation logic 714 operates to authenticate a CS or a device, download the client 720, and download the PG 706 for rendering on the device by the client 720.

The PG 706 comprises information in any suitable format that describes content or services that are available for devices to receive. For example, the PG 706 may be stored in a local memory of the server 700 and may comprise information such as content or service identifiers, scheduling information, pricing, or any other type of relevant information. In one aspect, the PG 706 comprises one or more identifiable sections that are updated by the processing logic 702 as changes are made to the available content or services.

The PG record 708 comprises hardware or software that operates to generate notification messages that identify or describe changes to the PG 706. For example, when the processing logic 702 updates the PG 706, the PG records logic 708 is notified about the changes. The PG records logic 708 then generates one or more notification messages that are transmitted to CSs, which may have been activated with the server 700, so that these CSs are promptly notified about the changes to the PG 706.

In one aspect, as part of the content delivery notification message, a broadcast indicator is provided that indicates when a section of the PG identified in the message will be broadcast. For example, in one aspect, the broadcast indicator comprises one bit to indicate that the section will be broadcast and a time indicator that indicates when the broadcast will occur. Thus, the CSs or the devices wishing to update their local copy of the PG records can listen for the broadcast at the designated time to receive the updated section of the PG records.

In one aspect, the content delivery notification system comprises program instructions stored on a computer-readable media, which when executed by a processor, for instance, the processing logic 702, provides the functions of the server 700 described herein. For example, the program instructions may be loaded into the server 700 from a computer-readable media, such as a floppy disk, CDROM, memory card, FLASH memory device, RAM, ROM, or any other type of memory device or computer-readable media that interfaces to the server 700 through the resources 704. In another aspect, the instructions may be downloaded into the server 700 from an external device or network resource that interfaces to the server 700 through the transceiver logic 710. The program instructions, when executed by the processing logic 702, provide one or more aspects of a guide state notification system as described herein.

Figure 8:
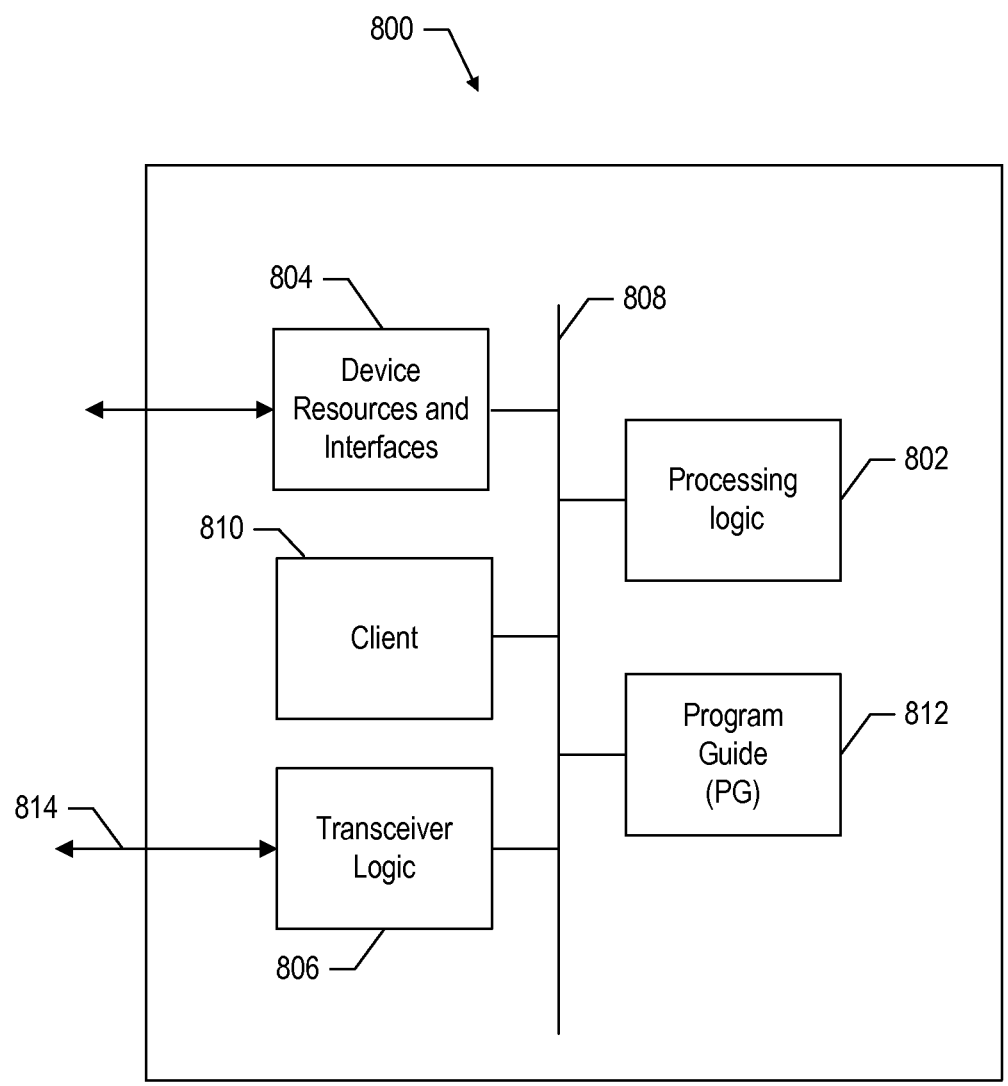
FIG. 8 depicts a block diagram of a content server (CS) or device suitable for use in one aspect of the content delivery system of FIG. 6.

FIG. 8 depicts one aspect of a content server (CS) or device 800 suitable for use in one aspect of a service delivery system. For example, CS 800 may be the CS 622 or the device 110 shown in FIG. 6. The CS 800 comprises processing logic 802, resources and interfaces 804, and transceiver logic 806, all coupled to a data bus 808. The CS 800 also comprises a client 810, and PG logic 812, which are also coupled to the data bus 808.

In one or more aspects, the processing logic 802 comprises a CPU, processor, gate array, hardware logic, memory elements, virtual machine, software, or any combination of hardware and software. Thus, the processing logic 802 generally comprises logic configured to execute machine-readable instructions and to control one or more other functional elements of the CS 800 via the internal data bus 808.

The resources and interfaces 804 comprise hardware or software that allows the CS 800 to communicate with internal and external systems. For example, internal systems may include mass storage systems, memory, display driver, modem, or other internal device resources. The external systems may include user interface devices, printers, disk drives, or other local devices or systems.

The transceiver logic 806 comprises hardware or software that operates to allow the CS 800 to transmit and receive data or other information with external devices or systems through communication channel 814. For example the communication channel 814 may comprise a network communication link, a wireless communication link, or any other type of communication link.

During operation, the CS or the device 800 is activated so that it may receive available content or services over a data network. For example, in one aspect, the CS or the device 800 identifies itself to a content provider server during an activation process. As part of the activation process, the CS or the device 800 receives and stores PG records by PG logic 812. The PG 812 contains information that identifies content or services available for the CS 800 to receive. The client 810 operates to render information in the PG logic 812 on the CS or the device 800 using the resources and interfaces 804. For example, the client 810 renders information in the PG logic 812 on a display screen that is part of the device. The client 810 also receives user input through the resources and interfaces so that a device user may select content or services.

In one aspect, the CS 800 receives notification messages through the transceiver logic 806. For example, the messages may be broadcast or unicast to the CS 800 and received by the transceiver logic 806. The PG notification messages identify updates to the PG records at the PG logic 812. In one aspect, the client 810 processes the PG notification messages to determine whether the local copy at the PG logic 812 needs to be updated. For example, in one aspect, the notification messages include a section identifier, start time, end time, and version number. The CS 800 operates to compare the information in the PG notification messages to locally stored information at the existing PG logic 812. If the CS 800 determines from the PG notification messages that one or more sections of the local copy at the PG logic 812 needs to be updated, the CS 800 operates to receive the updated sections of the PG in one of several ways. For example, the updated sections of the PG may be broadcasted at a time indicated in the PG notification messages, so that the transceiver logic 806 may receive the broadcasts and pass the updated sections to the CS 800, which in turn updates the local copy at the PG logic 812.

In another aspect, the CS 800 determines which sections of the PG need to be updated based on the received PG update notification messages, and transmits a request to a SCP server to obtain the desired updated sections of the PG. For example, the request may be formatted using any suitable format and comprise information such as a requesting CS identifier, section identifier, version number, or any other suitable information.

In one aspect, the CS 800 performs one or more of the following functions in one or more aspects of a PG notification system. It should be noted that the following functions might be changed, rearranged, modified, added to, deleted, or otherwise adjusted within the scope of the aspects. (1) The CS is activated for operation with a content provider system to receive content or services. As part of the activation process, a client and PG are transmitted to the CS; (2) One or more PG notification messages are received by the CS and used to determine if one or more sections of the locally stored PG need to be updated; (3) In one aspect, if the CS determines that one or more sections of the locally stored PG need to be updated, the CS listens to a broadcast from the distribution system to obtain the updated sections of the PG that it needs to update its local copy; (4) In another aspect, the CS transmits one or more request messages to the SCP to obtain the updated sections of the PG it needs; (5) In response to the request, the SCP transmits the updated sections of the PG to the CS; (6) The CS uses the received updated sections of the PG to update its local copy of the PG.

In one aspect, the content delivery system comprises program instructions stored on a computer-readable media, which when executed by a processor, such as the processing logic 802, provides the functions of the content delivery notification system as described herein. For example, instructions may be loaded into the CS 800 from a computer-readable media, such as a floppy disk, CDROM, memory card, FLASH memory device, RAM, ROM, or any other type of memory device or computer-readable media that interfaces to the CS 800 through the resources and interfaces 804. In another aspect, the instructions may be downloaded into the CS 800 from a network resource that interfaces to the CS 800 through the transceiver logic 806. The instructions, when executed by the processing logic 802, provide one or more aspects of a content delivery system as described herein.

It should be noted that the CS 800 represents just one implementation and that other implementations are possible within the scope of the aspects.

Figure 9:
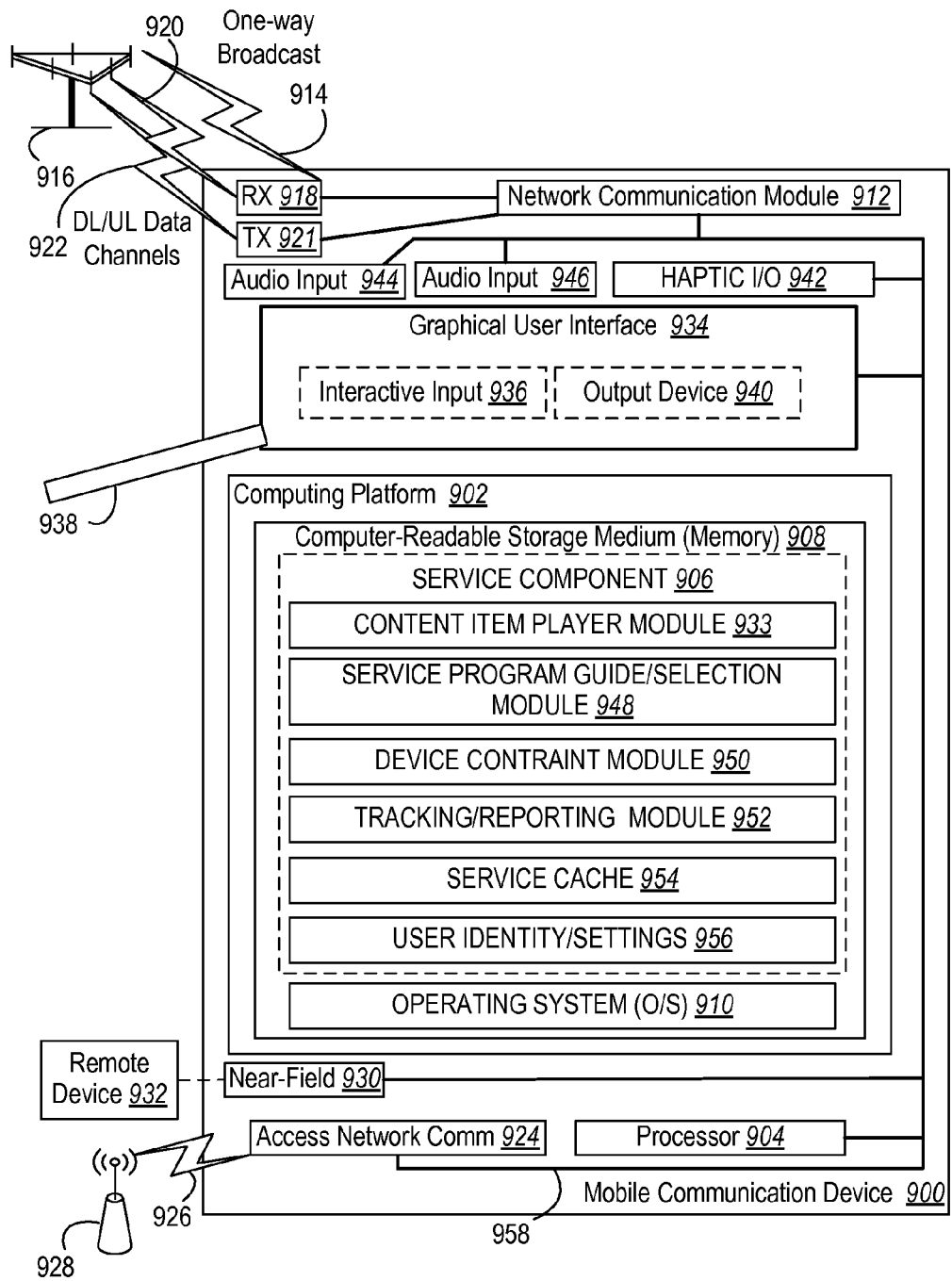
FIG. 9 depicts a block diagram of an illustrative mobile communication device that is capable of personalized service downloading ("clipping"), caching, interaction, tracking and reporting.

In FIG. 9, an illustrative mobile communication device 900 that is capable of personalized or selective service downloading, caching, interaction, tracking and reporting. To that end, a computing platform 902 supports execution by a processor 904 of a service component 906 that resides in computer-readable storage medium (memory) 908 along with an operating system (O/S) 910. A mobile network communication module 912 receives a broadcast channel 914 from a mobile service 916 at a receiver (RX) 918. The receiver 918 also receives a downlink (DL) channel 920 and a transmitter 921 sends an uplink (UL) channel 922 for interactive communications. As example, the network service can be performing third or fourth-generation cellular communication services. Alternatively or in addition, an access network communication module 924 can support over-the-air (OTA) communication channel 926 with a wireless access network 928. Alternatively or in addition, a near-field transceiver 930 can communicate to a remote device 932 as part of personal access network.

The service component 906 can comprise certain modules that enhance user experience with a service. A content item player module 933 can support weighted display of available content items associated with a service for selection as well as presenting selected content items on a GUI 934, depicted as including an interactive input 936 (e.g., touch screen for a stylus 938) and an output device 940. Alternatively or in addition, a haptic input/output device 942, an audio input (e.g., microphone) 944, and audio output (e.g., speaker) 946 are provided.

A service program guide selection module 948 can support prioritization and selection of content items associated with the service in accordance with a received program guide. A device constraint module 950 can adjust broadcast reception based upon available device storage space, portable power, processing capacity, compatibility of the type of content item with output capabilities, etc. A tracking and reporting module 952 can enhance subscription functionality and popularity rating by monitoring user interactions with cached content. A service cache 954 provides a structured storage for content items associated with a service. User/device identity and settings 956 provides information for subscription authentication, personalized settings for caching service, etc. The various components can be interconnected across a bus 958.

Figure 10:
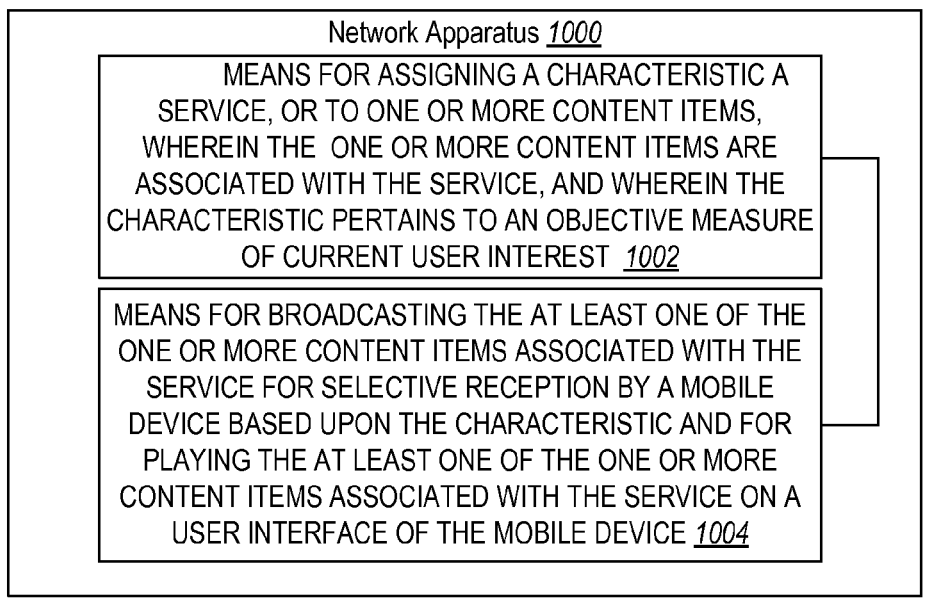
FIG. 10 depicts a block diagram of a network apparatus for facilitating personalized broadcast of content items associated with a service.

In FIG. 10, a network apparatus 1000 for facilitating personalized broadcast of user-generated content provides means 1002 for assigning a characteristic a service, or to one or more content items, wherein the one or more content items are associated with the service, and wherein the characteristic pertains to an objective measure of current user interest and a means 1004 for broadcasting the at least one of the one or more content items associated with the service for selective reception by a mobile device based upon the characteristic and for playing the at least one of the one or more content items associated with the service on a user interface of the mobile device.

Figure 11:
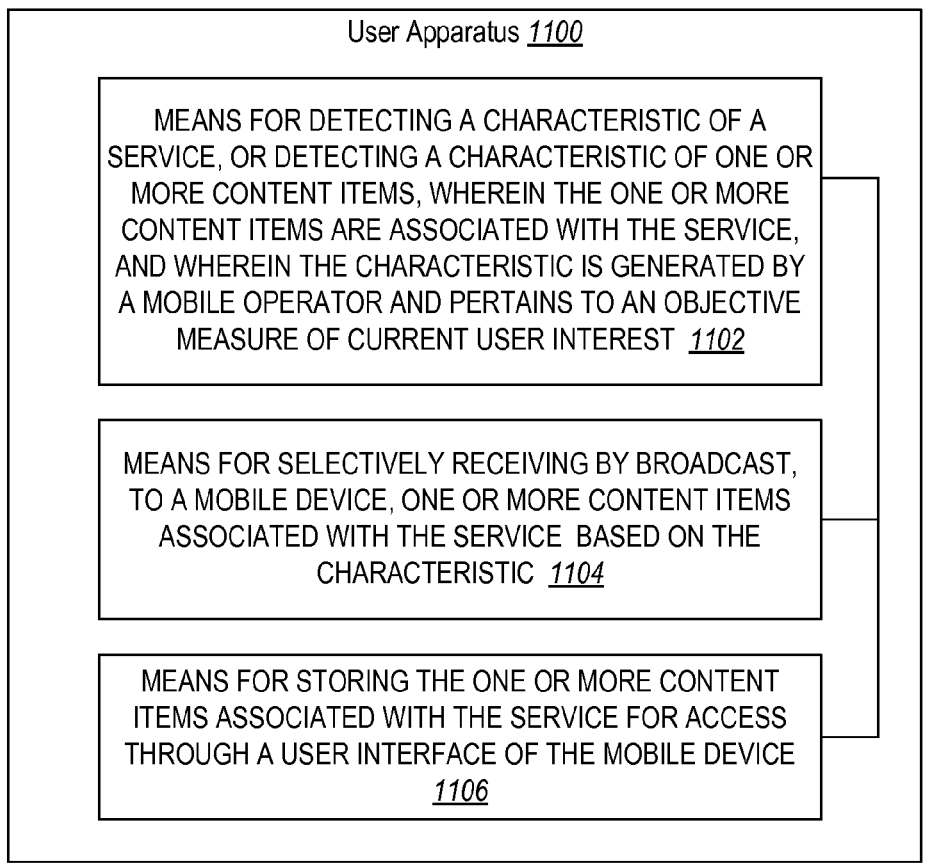
FIG. 11 depicts a block diagram of a user apparatus (e.g., mobile communication device) for personalized reception of a broadcast of content items associated with a service.

In FIG. 11, a user apparatus (e.g., mobile communication device) 1100 for personalized reception of broadcast of user-generated content comprises means 1102 for detecting a characteristic of a service, or detecting a characteristic of one or more content items, wherein the one or more content items are associated with the service, and wherein the characteristic is generated by a mobile operator and pertains to an objective measure of current user interest. Means 1104 are provided for selectively receiving by broadcast, to a mobile device, one or more content items associated with the service based on the characteristic. Means 1106 are provided for storing the one or more content items associated with the service for access through a user interface of the mobile device.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps or actions described above.

Further, the steps or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps or actions of a method or algorithm may reside as one or any combination or set of instructions or instructions on a machine readable medium or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects or aspects, it should be noted that various changes and modifications could be made herein without departing from the scope of the described aspects or aspects as defined by the appended claims. Furthermore, although elements of the described aspects or aspects may be described or claimed in the singular, the plural is contemplated unless limitation to the singular is explicitly stated. Additionally, all or a portion of any aspect or aspect may be utilized with all or a portion of any other aspect or aspect, unless stated otherwise. For example, it should be appreciated that benefits of the present innovation can be realized by fixed communication devices and by networks that incorporate communication channels at least in part that are not over-the-air.

What is claimed is:

1. A method for selectively receiving broadcast of one or more content items associated with a service to provide a unicast or multicast user experience, the method comprising:
   detecting a characteristic of a service or one or more content items associated with the service, the characteristic having a reliability time interval that indicates a time period between a broadcast date of the service or the one or more content items and a sampling time of the characteristic, the characteristic having an indication of how long the service or the one or more content items have been made available for broadcast distribution, wherein the characteristic is generated by a mobile operator and pertains to an objective measure of current user interest;
   selectively receiving by broadcast, to a mobile device, one or more content items associated with the service based on the characteristic; and
   storing the one or more content items associated with the service for access through a user interface of the mobile device.

2. The method of claim 1, wherein the characteristic further comprises a popularity parameter of the one or more content items or the service, wherein the popularity parameter for each of the one or more content items is detected either directly from the content item or indirectly from an inherited value of a popularity of the service as a default setting for the characteristic.

3. The method of claim 1, wherein each of the one or more content items further comprise a popularity weighting element to bias accessed content items results towards predefined criteria.

4. The method of claim 2, wherein the popularity parameter further comprises the sampling time of the characteristic, wherein the sampling time includes a time when the popularity parameter was generated.

5. The method of claim 4, wherein the popularity parameter is based at least in part upon at least one of:
   a volume of discussions postings associated with the service, and wherein a comparison of the volume of discussions postings associated with the service divided by the reliability time interval results in a volume of discussions per time interval characteristic, or
   a plurality of ratings associated with the service, and wherein a comparison of the plurality of ratings associated with the service divided by the reliability time interval results in a rating per time interval characteristic, or
   a number of times the service was accessed, and wherein a comparison of the number of time the service was accessed against the reliability time interval results in a number of accesses per time interval characteristic.

6. The method of claim 4, wherein the reliability time interval is segmented into predetermined subintervals.

7. The method of claim 6, wherein each of the segments is weighted differently to preferentially bias the relatively recent segments.

8. The method of claim 2, wherein the popularity parameter is detected based on at least one of: at least in part upon a volume of discussion postings associated with the service, at least in part upon a plurality of ratings submitted by users who accessed the service, at least in part upon a ranking based upon a number of users who accessed the service, or any combination thereof.

9. The method of claim 2, wherein the popularity parameter is detected based on a popularity of a group, wherein the popularity of the group is based at least in part of weighting popularity contributions from each member of the group using a predefined weighting system, wherein the predefined weighting system is defined by at least one from the group consisting of: a user selection, a mobile provider selection, a default mobile device selection.

10. The method of claim 1, further comprising:
    receiving a program guide for the service, the program guide providing a schedule for broadcast of one or more content items associated with the service; and
    scheduling to receive at least one of the one or more content items based upon the program guide.

11. A non-transitory computer-readable medium comprising:
    a first set of codes for causing a computer to detect a characteristic of a service, or detect a characteristic of one or more content items associated with the service, the characteristic having a reliability time interval that indicates a time period between a broadcast date of the service or the one or more content items and a sampling time of the characteristic, the characteristic having an indication of how long the service or the one or more content items have been made available for broadcast distribution, wherein characteristic is generated by a mobile operator and pertains to an objective measure of current user interest;
    a second set of codes for causing the computer to selectively by broadcast, to the mobile device, receive one or more content items associated with the service based on the characteristic; and
    a third set of codes for causing the computer to store the one or more content items associated with the service for access through a user interface of the mobile device.

12. An apparatus, comprising:
    means for detecting a characteristic of a service, or detecting a characteristic of one or more content items associated with the service, the characteristic having a reliability time interval that indicates a time period between a broadcast date of the service or the one or more content items and a sampling time of the characteristic, the characteristic having an indication of how long the service or the one or more content items have been made available for broadcast distribution, wherein the characteristic is generated by a mobile operator and pertains to an objective measure of current user interest;
    means for selectively receiving by broadcast, to a mobile device, one or more content items associated with the service based on the characteristic; and
    means for storing the one or more content items associated with the service for access through a user interface of the mobile device.

13. An apparatus for selectively receiving broadcast of one or more content items associated with a service to provide a unicast or multicast user experience, the apparatus comprising:
    a communication module for detecting a characteristic of a service, or detecting a characteristic of one or more content items associated with the service, the characteristic having a reliability time interval that indicates a time period between a broadcast date of the service or the one or more content items and a sampling time of the characteristic, the characteristic having an indication of how long the service or the one or more content items have been made available for broadcast distribution, wherein the characteristic is generated by a mobile operator and pertains to an objective measure of current user interest;
    a receiver for selectively receiving by broadcast, to a mobile device, one or more content items associated with the service based on the characteristic; and a user interface for accessing at least one of the one or more content items associated with the service.

14. The apparatus of claim 13, wherein the characteristic further comprises a popularity parameter of the one or more content items or the service, wherein the popularity parameter for each of the one or more content items is detected either directly from the content item or indirectly from an inherited value of a popularity of the service as a default setting for the characteristic.

15. The apparatus of claim 13, wherein each of the one or more content items further comprise a popularity weighting element to bias accessed content items results towards predefined criteria.

16. The apparatus of claim 14, wherein the popularity parameter further comprises the sampling time of the characteristic, wherein the sampling time includes a time when the popularity parameter was generated.

17. The apparatus of claim 16, wherein the popularity parameter is based at least in part upon at least one of:
   a volume of discussions postings associated with the service, and wherein a comparison of the volume of discussions postings associated with the service divided by the reliability time interval results in a volume of discussions per time interval characteristic, or
   a plurality of ratings associated with the service, and wherein a comparison of the plurality of ratings associated with the service divided by the reliability time interval results in a rating per time interval characteristic, or
   a number of times the service was accessed, and wherein a comparison of the number of time the service was accessed against the reliability time interval results in a number of accesses per time interval characteristic.

18. The apparatus of claim 16, wherein the reliability time interval is segmented into predetermined subintervals.

19. The apparatus of claim 18, wherein each of the segments is weighted differently to preferentially bias the relatively recent segments.

20. The apparatus of claim 15, wherein the popularity parameter is detected based on at least one of: at least in part upon a volume of discussion postings associated with the service, at least in part upon a plurality of ratings submitted by users who accessed the service, at least in part upon a ranking based upon a number of users who accessed the service, or any combination thereof.

21. The apparatus of claim 14, wherein the popularity parameter is detected based on a popularity of a group, wherein the popularity of the group is based at least in part of weighting popularity contributions from each member of the group using a predefined weighting system, wherein the predefined weighting system is defined by at least one from the group consisting of: a user selection, a mobile provider selection, a default mobile device selection.

22. The apparatus of claim 13, further comprising:
   the receiver for receiving a program guide for the service, the program guide providing a schedule for broadcast of one or more content items associated with the service; and
   the communication module for scheduling to receive at least one of the one or more content items based upon the program guide.

23. A method for broadcast of a service to provide a unicast or multicast user experience, comprising:
   assigning a characteristic to a service, or to one or more content items associated with the service, the characteristic having a reliability time interval that indicates a time period between a broadcast date of the service or the one or more content items and a sampling time of the characteristic, the characteristic having an indication of how long the service or the one or more content items have been made available for broadcast distribution, wherein the characteristic pertains to an objective measure of current user interest; and
   transmitting the at least one of the one or more content items associated with the service for selective reception by a mobile device based upon the characteristic and for playing the at least one of the one or more content items associated with the service on a user interface of the mobile device.

24. The method of claim 23, wherein the characteristic further comprises a popularity parameter of the one or more content items or the service, wherein the popularity parameter for each of the one or more content items is detected either directly from the content item or indirectly from an inherited value of a popularity of the service as a default setting for the characteristic.

25. The method of claim 23, wherein each of the one or more content items further comprise a popularity weighting element to bias accessed content items results towards predefined criteria.

26. The method of claim 24, wherein the popularity parameter further comprises the sampling time of the characteristic, wherein the sampling time includes a time when the popularity parameter was generated.

27. The method of claim 26, wherein the popularity parameter is based at least in part upon at least one of:
   a volume of discussions postings associated with the service, and wherein a comparison of the volume of discussions postings associated with the service divided by the reliability time interval results in a volume of discussions per time interval characteristic, or
   a plurality of ratings associated with the service, and wherein a comparison of the plurality of ratings associated with the service divided by the reliability time interval results in a rating per time interval characteristic, or
   a number of times the service was accessed, and wherein a comparison of the number of time the service was accessed against the reliability time interval results in a number of accesses per time interval characteristic.

28. The method of claim 26, wherein the reliability time interval is segmented into predetermined subintervals.

29. The method of claim 28, wherein each of the segments is weighted differently to preferentially bias the relatively recent segments.

30. The method of claim 24, wherein the popularity parameter is detected based on at least one of: at least in part upon a volume of discussion postings associated with the service, at least in part upon a plurality of ratings submitted by users who accessed the service, at least in part upon a ranking based upon a number of users who accessed the service, or any combination thereof.

31. The method of claim 24, wherein the popularity parameter is detected based on a popularity of a group, wherein the popularity of the group is based at least in part of weighting popularity contributions from each member of the group using a predefined weighting system, wherein the predefined weighting system is defined by at least one from the group consisting of: a user selection, a mobile provider selection, a default mobile device selection.

32. The method of claim 23, further comprising:
   generating a program guide for the service, the program guide providing a schedule for broadcast of one or more content items associated with the service; and broadcasting at least a portion of the one or more content items associated with the service according to the program guide.

33. A non-transitory computer-readable medium comprising:
a first set of codes for causing a computer to assign a characteristic to a service, or to one or more content items associated with the service, the characteristic having a reliability time interval that indicates a time period between a broadcast date of the service or the one or more content items and a sampling time of the characteristic, the characteristic having an indication of how long the service or the one or more content items have been made available for broadcast distribution, wherein the characteristic pertains to an objective measure of current user interest; and
a second set of codes for causing the computer to transmit the at least one of the one or more content items associated with the service for selective reception by a mobile device based upon the characteristic and for playing the at least one of the one or more content items associated with the service on a user interface of the mobile device.

34. An apparatus, comprising:
means for assigning a characteristic to a service, or to one or more content items associated with the service, the characteristic having a reliability time interval that indicates a time period between a broadcast date of the service or the one or more content items and a sampling time of the characteristic, the characteristic having an indication of how long the service or the one or more content items have been made available for broadcast distribution, wherein the characteristic pertains to an objective measure of current user interest; and
means for transmitting the at least one of the one or more content items associated with the service for selective reception by a mobile device based upon the characteristic and for playing the at least one of the one or more content items associated with the service on a user interface of the mobile device.

35. An apparatus for broadcast of one or more content items associated with a service to provide a unicast or multicast user experience, the apparatus comprising:
a computing platform configured to assign a characteristic of a service, or to one or more content items associated with the service, the characteristic having a reliability time interval that indicates a time period between a broadcast date of the service or the one or more content items and a sampling time of the characteristic, the characteristic having an indication of how long the service or the one or more content items have been made available for broadcast distribution, wherein the characteristic generated by a mobile operator pertains to an objective measure of current user interest; and
a transmitter configured to transmit the one or more content items associated with the service for selective reception by a user mobile device based upon the characteristic and for playing the at least one of the one or more content items associated with the service on a user interface of the mobile device.

36. The apparatus of claim 35, wherein the characteristic further comprises a popularity parameter of the one or more content items or the service, wherein the popularity parameter for each of the one or more content items is detected either directly from the content item or indirectly from an inherited value of a popularity of the service as a default setting for the characteristic.

37. The apparatus of claim 35, wherein each of the one or more content items further comprise a popularity weighting element to bias accessed content items results towards predefined criteria.

38. The apparatus of claim 36, wherein the popularity parameter further comprises the sampling time of the characteristic, wherein the sampling time includes a time when the popularity parameter was generated.

39. The apparatus of claim 38, wherein the popularity parameter is based at least in part upon at least one of:
a volume of discussions postings associated with the service, and wherein a comparison of the volume of discussions postings associated with the service divided by the reliability time interval results in a volume of discussions per time interval characteristic, or
a plurality of ratings associated with the service, and wherein a comparison of the plurality of ratings associated with the service divided by the reliability time interval results in a rating per time interval characteristic, or
a number of times the service was accessed, and wherein a comparison of the number of time the service was accessed against the reliability time interval results in a number of accesses per time interval characteristic.

40. The apparatus of claim 38, wherein the reliability time interval is segmented into predetermined subintervals.

41. The apparatus of claim 40, wherein each of the segments is weighted differently to preferentially bias the relatively recent segments.

42. The apparatus of claim 36, wherein the popularity parameter is detected based on at least one of: at least in part upon a volume of discussion postings associated with the service, at least in part upon a plurality of ratings submitted by users who accessed the service, at least in part upon a ranking based upon a number of users who accessed the service, or any combination thereof.

43. The apparatus of claim 36, wherein the popularity parameter is detected based on a popularity of a group, wherein the popularity of the group is based at least in part of weighting popularity contributions from each member of the group using a predefined weighting system, wherein the predefined weighting system is defined by at least one from the group consisting of: a user selection, a mobile provider selection, a default mobile device selection.

44. The apparatus of claim 35, wherein:
the computing platform is further configured to generate a program guide for the service, the program guide providing a schedule for broadcast of one or more content items associated with the service; and
the transmitter is further configured to broadcast at least a portion of the one or more content items associated with the service according to the program guide.

* * * * *